United States Patent
Davis

(10) Patent No.: US 9,587,503 B2
(45) Date of Patent: Mar. 7, 2017

(54) HINGED SEAL

(71) Applicant: UNITED TECHNOLOGIES CORPORATION, Farmington, CT (US)

(72) Inventor: Timothy M Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/830,665

(22) Filed: Aug. 19, 2015

(65) Prior Publication Data

US 2016/0115808 A1    Apr. 28, 2016

Related U.S. Application Data

(60) Provisional application No. 62/068,508, filed on Oct. 24, 2014.

(51) Int. Cl.
| | | |
|---|---|---|
| *F01D 11/00* | (2006.01) | |
| *F16J 15/10* | (2006.01) | |
| *F16J 15/08* | (2006.01) | |

(52) U.S. Cl.
CPC ......... *F01D 11/005* (2013.01); *F16J 15/0887* (2013.01); *F16J 15/104* (2013.01); *F05D 2220/32* (2013.01); *F05D 2240/55* (2013.01)

(58) Field of Classification Search
CPC ...... F01D 11/00; F01D 11/001; F01D 11/003; F01D 11/005; F01D 11/006; F16J 15/0887
See application file for complete search history.

(56) References Cited

U.S. PATENT DOCUMENTS

| | | | |
|---|---|---|---|
| 4,438,939 A | | 3/1984 | Pask et al. |
| 4,783,085 A | | 11/1988 | Wicks et al. |
| 5,014,917 A | | 5/1991 | Sirocky et al. |
| 6,332,617 B1 | * | 12/2001 | Leveaux ............... F01D 5/3038 277/433 |
| 7,121,790 B2 | | 10/2006 | Fokine et al. |
| 7,347,425 B2 | | 3/2008 | James |
| 8,651,497 B2 | | 2/2014 | Tholen et al. |
| 2003/0123979 A1 | * | 7/2003 | Mohammed-Fakir  F01D 11/005 415/189 |
| 2008/0267770 A1 | * | 10/2008 | Webster ................ F01D 11/005 415/173.1 |
| 2009/0243228 A1 | | 10/2009 | Heinemann et al. |
| 2013/0113168 A1 | | 5/2013 | Lutjen et al. |

* cited by examiner

*Primary Examiner* — Gilbert Lee
(74) *Attorney, Agent, or Firm* — Cantor Colburn LLP

(57) ABSTRACT

The present disclosure relates generally to a seal between two components. The seal includes a first substantially frustoconical seal section including a first seal section radially outer end and a first seal section radially inner end. The seal also includes a second substantially frustoconical seal section including a second seal section radially outer end and a second seal section radially inner end, wherein the second seal section radially inner end is supported by the first seal section radially inner end to create a hinge joint allowing an angle defined between the first and second seal sections to change.

19 Claims, 7 Drawing Sheets

HINGED SEAL

CROSS REFERENCE TO RELATED APPLICATION

This application claims the benefit of and incorporates by reference herein the disclosure of U.S. Ser. No. 62/068,508, filed Oct. 24, 2014.

TECHNICAL FIELD OF THE DISCLOSURE

The present disclosure is generally related to seals and, more specifically, to a hinged seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a circumferential space defined by first and second components disposed about an axial centerline is disclosed, the seal comprising: a first substantially frustoconical seal section comprising: a first seal section radially outer end; a first seal section radially inner end; and a second substantially frustoconical seal section comprising: a second seal section radially outer end; a second seal section radially inner end supported on the first seal section radially inner end to create a hinge joint allowing an angle defined between the first and second seal sections to change.

In a further embodiment of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, the first seal section is split at one circumferential location thereof.

In a further embodiment of any of the above, the first and second seal sections are both split at one respective circumferential location thereof.

In a further embodiment of any of the above, a bridging seal is disposed adjacent the first and second seal sections and at least partially covering the split locations.

In a further embodiment of any of the above, a plurality of tabs are provided extending from the first seal section radially inner end; and a plurality of slots are formed through the second seal section and disposed adjacent the second seal section radially inner end; wherein each of the plurality of tabs extends through a respective one of the plurality of slots.

In a further embodiment of any of the above, a plurality of substantially axially extending portions are provided extending from the first seal section radially outer end and/or the second seal section radially outer end; and a plurality of substantially radially extending portions are provided, each of the plurality of substantially radially extending portions extending from a respective one of the plurality of tabs.

In a further embodiment of any of the above, a plurality of first slots are formed through the first seal section and disposed adjacent the first seal section radially inner end; a plurality of second slots are formed through the second seal section and disposed adjacent the second seal section radially inner end; and a plurality of clips are provided; wherein each of the plurality of clips extends through a respective one of the plurality of first slots and the plurality of second slots.

In a further embodiment of any of the above, each of the plurality of clips comprises a piece of material including a first material end and a second material end formed into a loop wherein the first material end and the second material end are disposed adjacent one another.

In a further embodiment of any of the above, a rope seal is disposed between the first and second seal sections.

In a further embodiment of any of the above, the rope seal is selected from the group consisting of: solid and hollow.

In another embodiment, a system is disclosed, comprising: a first component including a first surface; a second component including a second surface, the first and second components disposed about an axial centerline, the second component disposed adjacent the first component and defining a seal cavity therebetween; and a seal disposed in the seal cavity, the seal including: a first substantially frustoconical seal section comprising: a first seal section radially outer end; a first seal section radially inner end; and a second substantially frustoconical seal section comprising: a second seal section radially outer end; a second seal section radially inner end supported on the first seal section radially inner end to create a hinge joint allowing an angle defined between the first and second seal sections to change; wherein pressure within the seal cavity urges the seal to seat against the first surface and the second surface.

In a further embodiment of any of the above, a plurality of tabs are provided extending from the first seal section radially inner end; and a plurality of slots formed through the second seal section and disposed adjacent the second seal section radially inner end; wherein each of the plurality of tabs extends through a respective one of the plurality of slots.

In a further embodiment of any of the above, a plurality of substantially axially extending portions are provided extending from the first seal section radially outer end and/or the second seal section radially outer end; and a plurality of substantially radially extending portions are provided, each of the plurality of substantially radially extending portions extending from a respective one of the plurality of tabs.

In a further embodiment of any of the above, a plurality of first slots are formed through the first seal section and disposed adjacent the first seal section radially inner end; a plurality of second slots are formed through the second seal section and disposed adjacent the second seal section radially inner end; and a plurality of clips are provided; wherein each of the plurality of clips extends through a respective one of the plurality of first slots and the plurality of second slots.

In a further embodiment of any of the above, each of the plurality of clips comprises a piece of material including a first material end and a second material end formed into a loop wherein the first material end and the second material end are disposed adjacent one another.

In a further embodiment of any of the above, a rope seal is disposed between the first and second seal sections.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
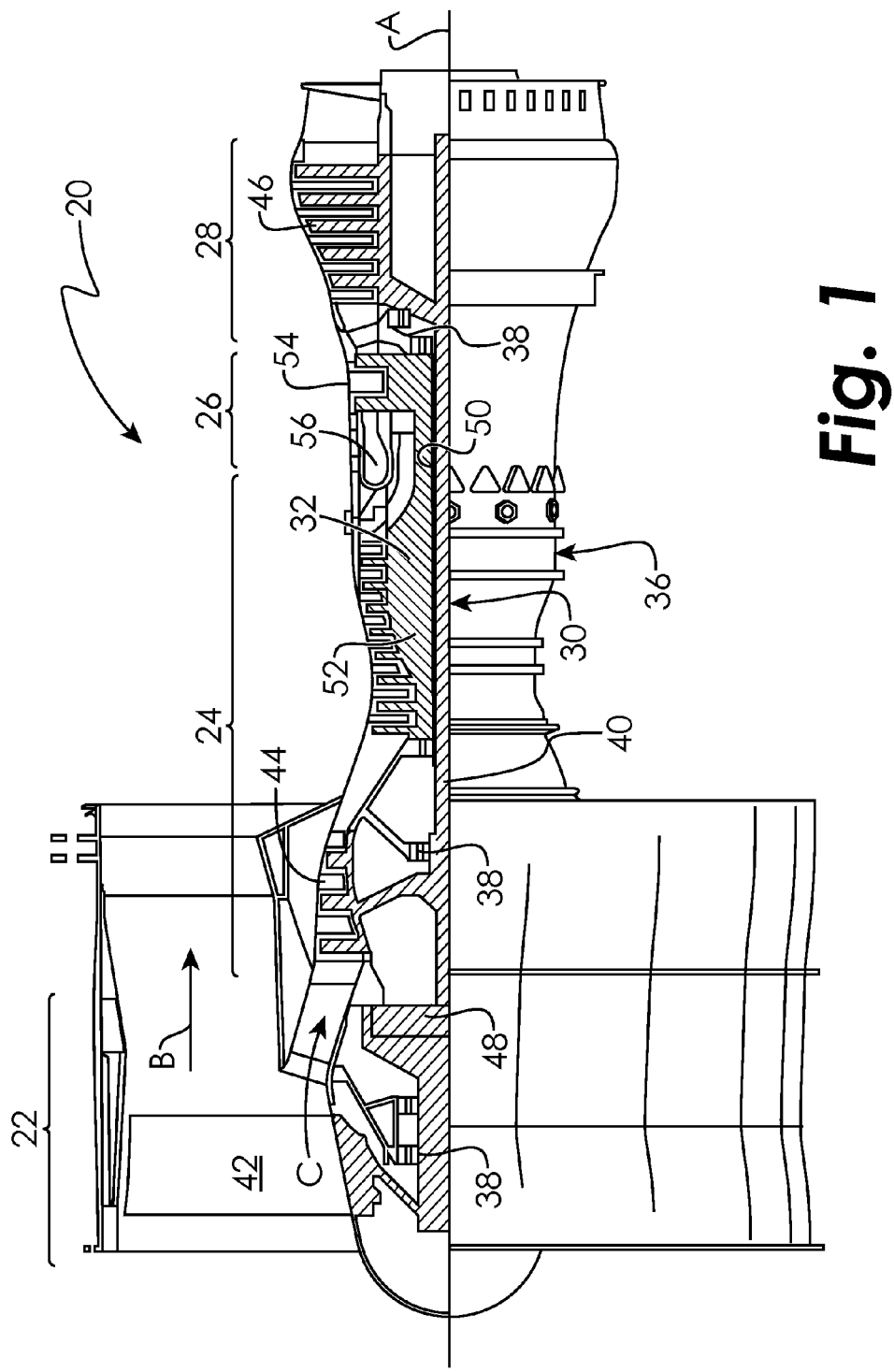
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
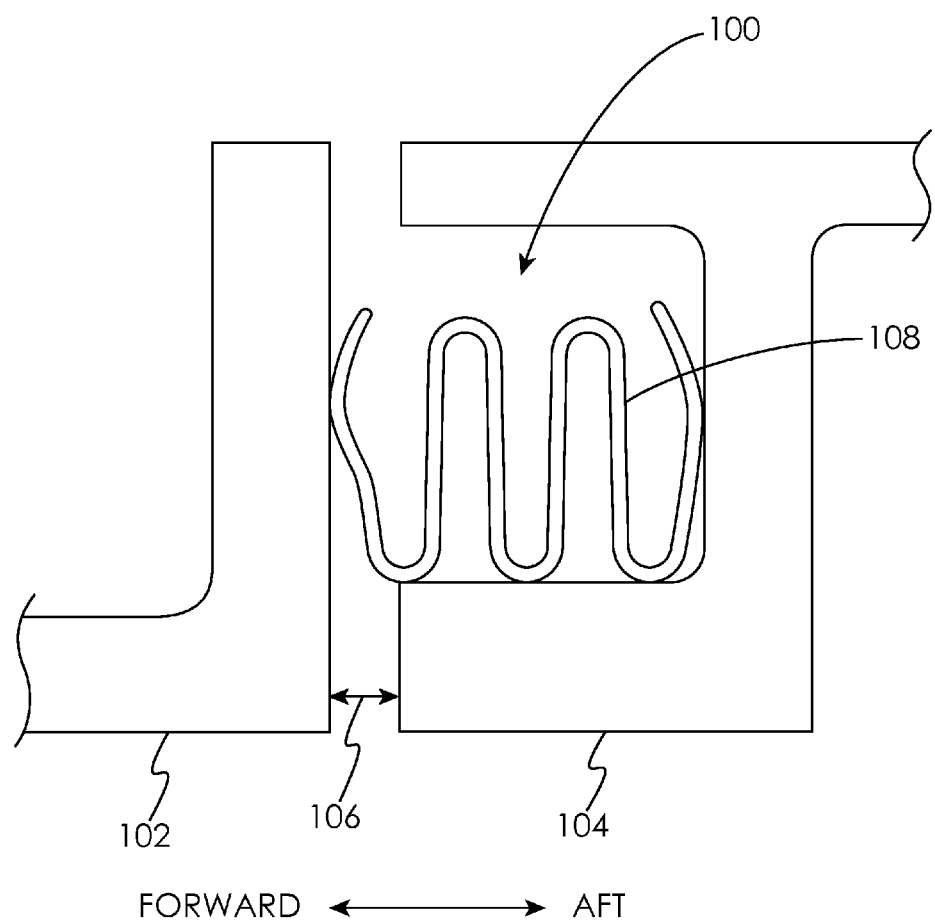
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such a nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
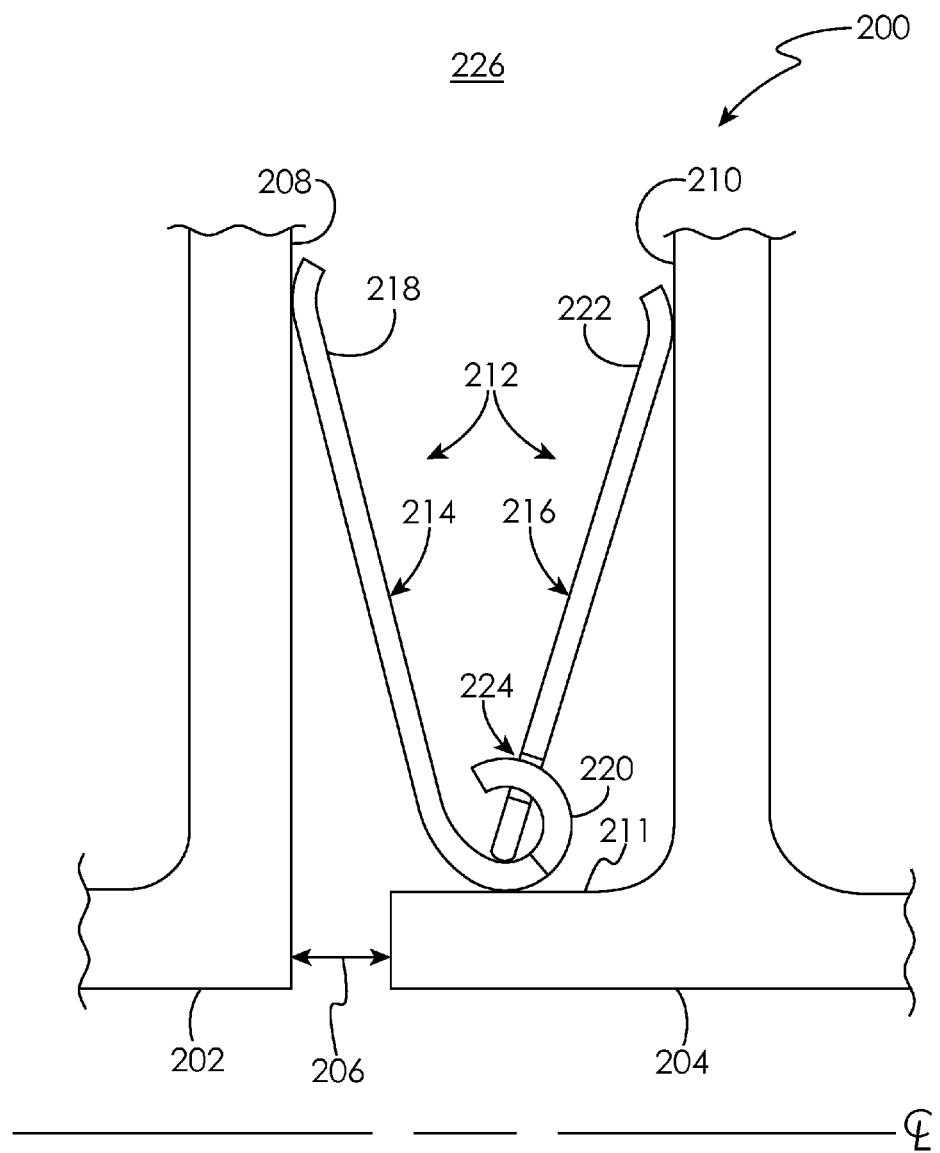
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples.

The seal 212 is formed from a first seal section 214 and a second seal section 216. The first seal section 214 and the second seal section 216 generally frustoconical in shape, similar to Belleville washers, and contact each other at their inner diameters while their outer diameters contact the cavity 200 walls. In one embodiment, the second seal section 216 is split at one circumferential location. In another embodiment, both the first seal section 214 and the second seal section 216 are each split at one circumferential location. In another embodiment, both the first seal section 214 and the second seal section 216 are each annular full hoop components. The first seal section 214 includes a body 218 and a plurality of semi-circular tabs 220 extending from the inner diameter at a plurality of locations around the hoop of the body 218. The second seal section 216 rests upon the first seal section 214 at the inner diameter of the second seal section 216 and includes a body 222 with a plurality of slots 224 formed therethrough at a plurality of locations around the hoop of the body 222. Each of the tabs 220 is disposed within a respective slot 224. This connection creates a hinge joint between the first seal section 214 and the second seal section 216. The first seal section 214 contacts the surface 208 of component 202 and may contact the surface 211 of component 204, while the second seal section 216 contacts the first seal section 214 and the surface 210 of component 204. The seal 212 may include a coating and/or a sheath to provide increased wear resistance.

Pressure in a secondary flow cavity 226 is transmitted to the seal cavity 200 through an opening defined by the components 202, 204. This pressure acts upon the surfaces of the seal sections 214, 216, thereby causing the outside diameter of the seal section 214 to seat against the surface 208 of the component 202 and the outside diameter of the seal section 216 to seat against the surface 210 of the component 204. This pressure also loads the seal section 216 against the first seal section 214 if the second seal section 216 is split at one circumferential location. If the first seal section 214 is also split at one place circumferentially, then the pressure differential loads the seal 212 radially inward against the surface 211 of the component 204, as shown. This prevents most or all of the secondary flow cavity 226 gases from reaching the design clearance 206 area and flow path. A circumferentially-oriented sliding bridge seal (not shown) may be provided to cover the circumferential split to limit leakage therethrough. As the two components 202 and 204 move relative to each other in the axial and/or radial direction due to thermal and/or mechanical-driven displacements of the components 202, 204, the seal sections 214, 216 are free to flex like the w-seal 108 while the pressure forces acting upon the surfaces of the seal sections 214, 216 load the seal 212 so that it remains in contact with both components 202 and 204 as shown. Therefore, sealing is maintained while the components 202 and 204 and the components of the seal 212 move relative to one another. Unlike the w-seal 108, however, each of the seal sections 214, 216 is more flexible/resilient than the outer legs of the w-seal 108 because the radially inner ends of the seal sections 214, 216 are free to rotate since they are simply supported, rather than cantilevered. In an embodiment, the seal 212 may be sized to be lightly compressed in the cold condition to prevent damage during transportation and to ensure that the seal 212 is immediately energized by the delta pressure at engine start up.

Figure 4:
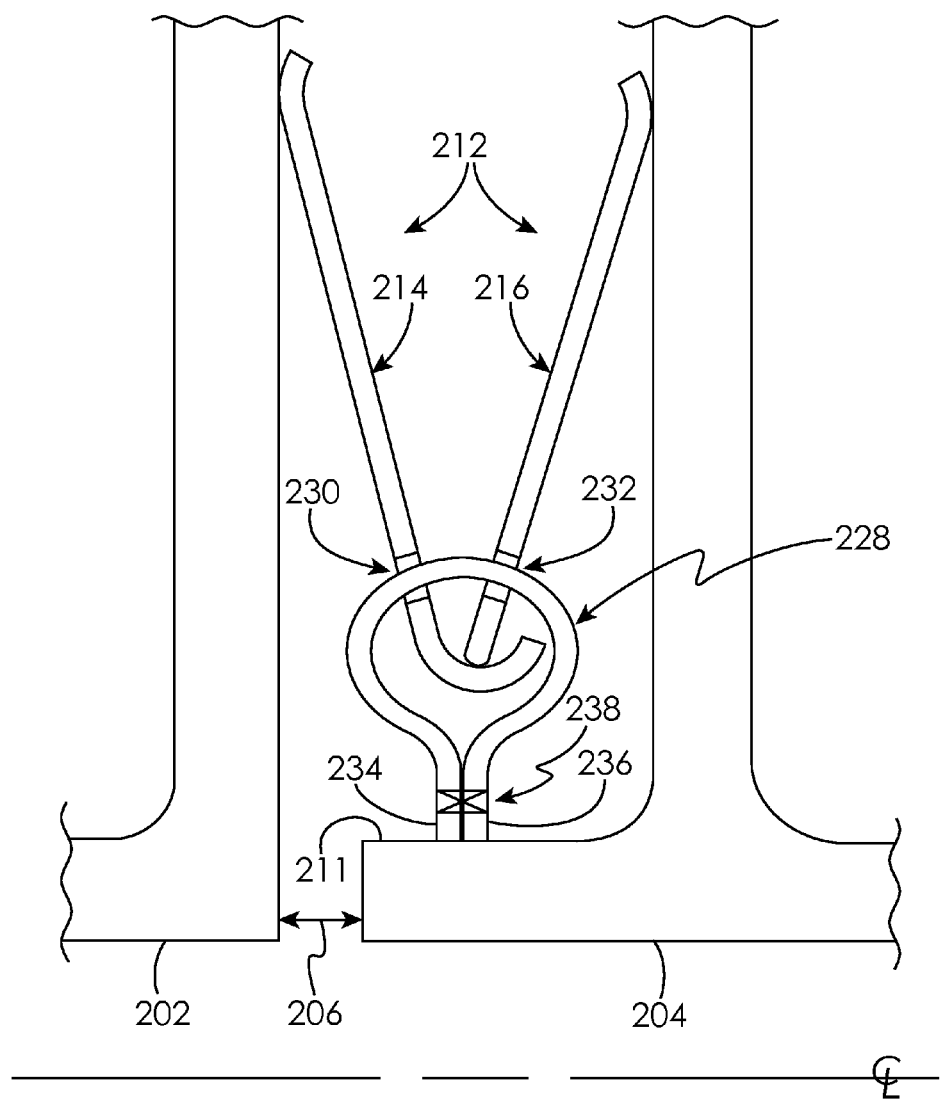
FIG. 4 is a schematic cross-sectional view of a seal and seal cavity in an embodiment.

With reference to FIG. 4, the seal sections 214, 216 of the seal 212 may be retained by a plurality of clips 228 spaced around the circumference of the inner diameter of the seal 212 in an embodiment. Each clip 228 may extend through a slot 230 in the seal section 214 and a slot 232 in the seal section 216. In an embodiment, the clip 228 may be formed from a piece of material formed into a loop such that a first end 234 and a second end 236 are disposed adjacent one another. The first end 234 and the second end 236 may be affixed to one another at 238 in an embodiment, such as by resistance welding to name just one non-limiting embodiment.

Figure 5:
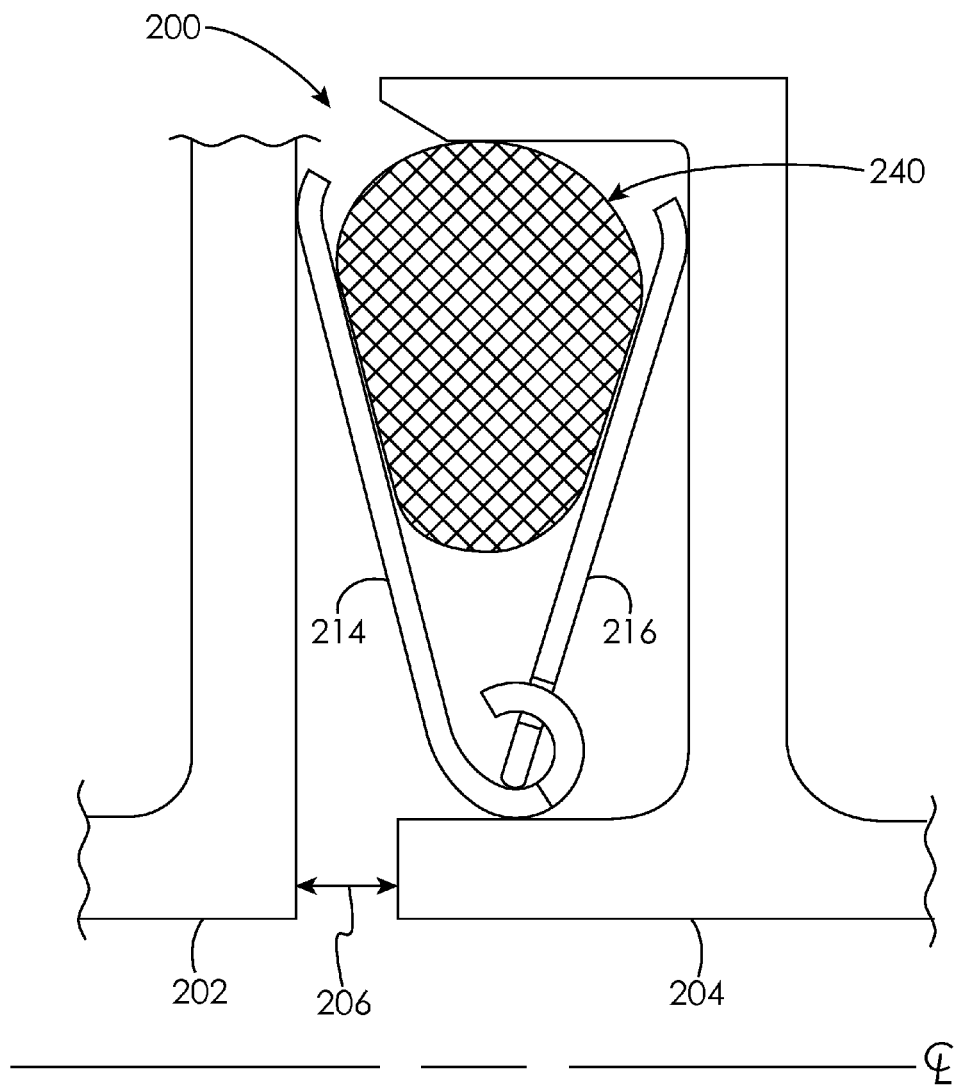
FIG. 5 is a schematic cross-sectional view of a seal, a rope seal and seal cavity in an embodiment.
Figure 6:
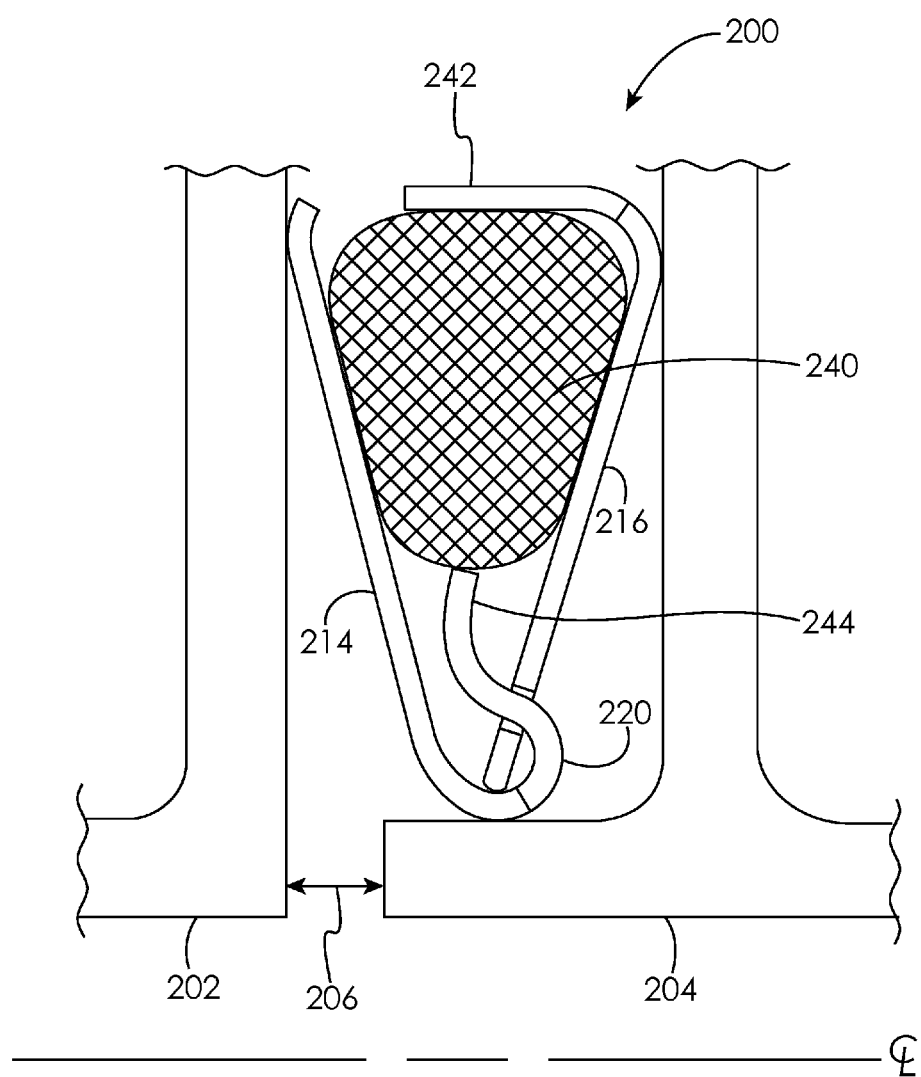
FIG. 6 is a schematic cross-sectional view of a seal, a rope seal and seal cavity in an embodiment.

In the embodiment of FIG. 5, a rope seal 240 may be disposed between the seal section 214 and the seal section 216. The rope seal 240, which may be solid or hollow in various embodiments to achieve a desired resilience, may be formed from a material appropriate to the anticipated operating conditions of the rope seal 240, such as a high-temperature ceramic fiber material, a high-temperature metal alloy, or a combination of the two to name just a few non-limiting examples. The rope seal 240 will act to reduce leakage through the joint between the seal section 214 and the seal section 216. In the embodiment of FIG. 6, a substantially axially extending section 242 is added to the radially outer portion of the seal section 216 at a plurality of circumferential locations. Furthermore, a substantially radially extending section 244 is added to some or all of the tabs 220. This results in additionally maintaining the position of the rope seal 240 in a cavity defined between the section 242 and the section 244.

Figure 7:
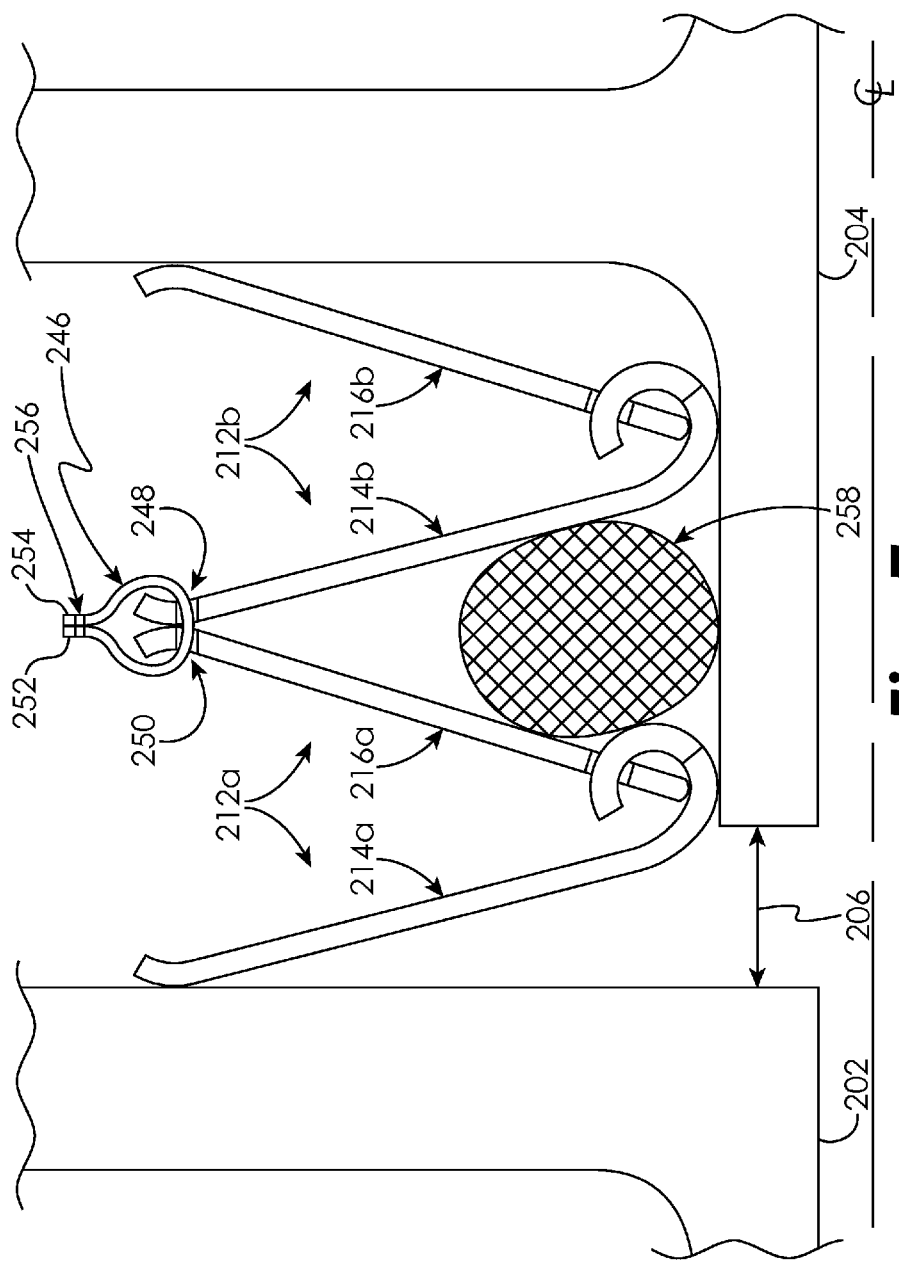
FIG. 7 is a schematic cross-sectional view of a seal, a rope seal and seal cavity in an embodiment.

As shown in the embodiment of FIG. 7, multiple seals 212 may be positioned side-by-side in series to achieve additional resilience. In the illustrated embodiment, seal 212a is positioned adjacent seal 212b such that seal section 216a is in contact with seal section 214b. The seal sections 216a and 214b may be retained by a plurality of clips 246 spaced around the circumference of the outer diameter of the seal 212a/212b in an embodiment. Each clip 246 may extend through a slot 248 in the seal section 216a and a slot 250 in the seal section 214b. In an embodiment, the clip 246 may be formed from a piece of material formed into a loop such that a first end 252 and a second end 254 are disposed adjacent one another. The first end 252 and the second end 254 may be affixed to one another at 256 in an embodiment, such as by resistance welding to name just one non-limiting embodiment. In some embodiments, a rope seal 258 may be disposed between seal section 216a and seal section 214b to provide additional leakage prevention. Although two seals 212a, 212b are illustrated, any number of seals 212 may be placed side-by-side to create a larger seal for applications requiring additional flexibility.

Unlike the seal 108, the seal sections 214 and 216 are simply supported at either end, thus the seal 212 is less substantially deflected as the components 202 and 204 move relative to each other during engine assembly and engine operation, which is beneficial because the seal 212 can be made from a lower strength material that may be lower cost, have higher temperature capability, be more manufacturable, and/or more wear-resistant. For a given cavity 200 expansion or contraction, the seal 212 may be used within a smaller design space than the w-seal 108. The seal 212 exhibits improved wear tolerance because thicker sheet stock may be used within a given design space. Additionally, the seal 212 may be produced more cost-effectively because the two conical-shaped seal sections 214, 216 are simpler to make than a ring having multiple convolutions. The seal 212 also exhibits improved vibration tolerance due to friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a circumferential space defined by first and second components disposed about an axial centerline, the seal comprising:
   a first substantially frustoconical seal section comprising:
      a first seal section radially outer end;
      a first seal section radially inner end; and
   a second substantially frustoconical seal section comprising:
      a second seal section radially outer end;
      a second seal section radially inner end supported on the first seal section radially inner end to create a hinge joint allowing an angle defined between the first and second seal sections to change.

2. The seal of claim 1, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

3. The seal of claim 1, further comprising:
   a coating applied to at least a portion of each of the first and second seal sections.

4. The seal of claim 1, further comprising:
   a sheath covering at least a portion of each of the first and second seal sections.

5. The seal of claim 1, wherein the first seal section is split at one circumferential location thereof.

6. The seal of claim 1, wherein the first and second seal sections are both split at one respective circumferential location thereof.

7. The seal of claim 6, further comprising a bridging seal disposed adjacent the first and second seal sections and at least partially covering the split locations.

8. The seal of claim 1, further comprising:
   a plurality of tabs extending from the first seal section radially inner end; and
   a plurality of slots formed through the second seal section and disposed adjacent the second seal section radially inner end;
   wherein each of the plurality of tabs extends through a respective one of the plurality of slots.

9. The seal of claim 8, further comprising:
   a plurality of substantially axially extending portions extending from the first seal section radially outer end and/or the second seal section radially outer end; and
   a plurality of substantially radially extending portions, each of the plurality of substantially radially extending portions extending from a respective one of the plurality of tabs.

10. The seal of claim 1, further comprising:
    a plurality of first slots formed through the first seal section and disposed adjacent the first seal section radially inner end;
    a plurality of second slots formed through the second seal section and disposed adjacent the second seal section radially inner end; and
    a plurality of clips;
    wherein each of the plurality of clips extends through a respective one of the plurality of first slots and the plurality of second slots.

11. The seal of claim 10, wherein each of the plurality of clips comprises a piece of material including a first material end and a second material end formed into a loop wherein the first material end and the second material end are disposed adjacent one another.

12. The seal of claim 1, further comprising a rope seal disposed between the first and second seal sections.

13. The seal of claim 12, wherein the rope seal is selected from the group consisting of: solid and hollow.

14. A system, comprising:
a first component including a first surface;
a second component including a second surface, the first and second components disposed about an axial centerline, the second component disposed adjacent the first component and defining a seal cavity therebetween; and
a seal disposed in the seal cavity, the seal including:
a first substantially frustoconical seal section comprising:
a first seal section radially outer end;
a first seal section radially inner end; and
a second substantially frustoconical seal section comprising:
a second seal section radially outer end;
a second seal section radially inner end supported on the first seal section radially inner end to create a hinge joint allowing an angle defined between the first and second seal sections to change;
wherein pressure within the seal cavity urges the seal to seat against the first surface and the second surface.

15. The system of claim 14, further comprising:
a plurality of tabs extending from the first seal section radially inner end; and
a plurality of slots formed through the second seal section and disposed adjacent the second seal section radially inner end;
wherein each of the plurality of tabs extends through a respective one of the plurality of slots.

16. The system of claim 15, further comprising:
a plurality of substantially axially extending portions extending from the first seal section radially outer end and/or the second seal section radially outer end; and
a plurality of substantially radially extending portions, each of the plurality of substantially radially extending portions extending from a respective one of the plurality of tabs.

17. The system of claim 14, further comprising:
a plurality of first slots formed through the first seal section and disposed adjacent the first seal section radially inner end;
a plurality of second slots formed through the second seal section and disposed adjacent the second seal section radially inner end; and
a plurality of clips;
wherein each of the plurality of clips extends through a respective one of the plurality of first slots and the plurality of second slots.

18. The system of claim 17, wherein each of the plurality of clips comprises a piece of material including a first material end and a second material end formed into a loop wherein the first material end and the second material end are disposed adjacent one another.

19. The system of claim 14, further comprising a rope seal disposed between the first and second seal sections.

* * * * *